(12) United States Patent
Dutta Choudhury et al.

(10) Patent No.: US 11,893,720 B1
(45) Date of Patent: Feb. 6, 2024

(54) AUTOMATIC IMAGE PROCESSING BASED ON CAPTION

(71) Applicant: QUALCOMM Incorporated, San Diego, CA (US)

(72) Inventors: Shubhobrata Dutta Choudhury, New Delhi (IN); Sai Krishna Bodapati, Vijaywada (IN)

(73) Assignee: QUALCOMM Incorporated, San Diego, CA (US)

( * ) Notice: Subject to any disclaimer, the term of this patent is extended or adjusted under 35 U.S.C. 154(b) by 585 days.

(21) Appl. No.: 16/898,240

(22) Filed: Jun. 10, 2020

(51) Int. Cl.
G06T 7/00 (2017.01)
G06T 5/00 (2006.01)
G06N 20/00 (2019.01)
G06V 20/20 (2022.01)

(52) U.S. Cl.
CPC .......... *G06T 7/0002* (2013.01); *G06N 20/00* (2019.01); *G06T 5/009* (2013.01); *G06V 20/20* (2022.01); *G06T 2207/20081* (2013.01)

(58) Field of Classification Search
CPC ............... G06T 7/0002; G06T 5/009; G06T 2207/20081; G06N 20/00; G06V 20/20
USPC ....................................................... 382/100
See application file for complete search history.

(56) References Cited

U.S. PATENT DOCUMENTS

| 10,405,025 B2 | 9/2019 | Aimone et al. |
| 10,440,078 B2 | 10/2019 | Farrell et al. |
| 2013/0239049 A1 | 9/2013 | Perrodin et al. |
| 2017/0289230 A1* | 10/2017 | Farrell .................. H04L 65/613 |
| 2019/0014378 A1 | 1/2019 | Shah et al. |
| 2019/0318003 A1 | 10/2019 | Kennedy et al. |

OTHER PUBLICATIONS

Wang, Xiaohui, Jia Jia, and Lianhong Cai. "Affective image adjustment with a single word." The Visual Computer 29.11 (2013): 1121-1133. (Year: 2013).*
Kumar, Puneet, and Balasubramanian Raman. "Domain Adaptation Based Technique for Image Emotion Recognition Using Image Captions." International Conference on Computer Vision and Image Processing. Springer, Singapore, 2020. (Year: 2020).*

(Continued)

*Primary Examiner* — Jonathan S Lee
(74) *Attorney, Agent, or Firm* — QUALCOMM Incorporated

(57) ABSTRACT

An image processing device receives a caption for an image before, during, or after capture of the image by an image capture device. The image processing device generates image processing settings based on the caption, for instance based on a mood indicated in the caption or an object identified in the caption. If the caption is received before image capture, the image processing settings may include image capture settings that the image capture device may use to alter exposure or focus during image capture. Once the image is captured, the image processing device may process the image based on the image processing settings, for instance by applying filters or adjusting gain, brightness, contrast, saturation, or colors. For instance, brightness and saturation may be altered if the caption indicates a happy or sad mood, and focus may be altered to focus on an object identified in a caption.

37 Claims, 7 Drawing Sheets

(56) References Cited

OTHER PUBLICATIONS

Huang, Feiran, et al. "Image-text sentiment analysis via deep multimodal attentive fusion." Knowledge-Based Systems 167 (2019): 26-37. (Year: 2019).*
Manjunatha, Varun, et al. "Learning to color from language." arXiv preprint arXiv:1804.06026 (2018). (Year: 2018).*
Weng, Shuchen, et al. "L-CoDe: Language-based Colorization using Color-object Decoupled Conditions." (2022). (Year: 2022).*
Xie, Yanping. Language-guided image colorization. MS thesis. ETH Zurich, Departement of Computer Science, 2018. (Year: 2018).*
Shi, Jing, et al. "A benchmark and baseline for language-driven image editing." Proceedings of the Asian Conference on Computer Vision. 2020. (Year: 2020).*
Li, Bowen, et al. "Manigan: Text-guided image manipulation." Proceedings of the IEEE/CVF Conference on Computer Vision and Pattern Recognition. 2020. (Year: 2020).*
Chen, Jianbo, et al. "Language-based image editing with recurrent attentive models." Proceedings of the IEEE Conference on Computer Vision and Pattern Recognition. 2018. (Year: 2018).*
Bahng, Hyojin, et al. "Coloring with words: Guiding image colorization through text-based palette generation." Proceedings of the european conference on computer vision (eccv). 2018. (Year: 2018).*
Wu F., et al., "Content-Based Colour Transfer", 2013, Computer Graphics forum, vol. 32, No. 1, pp. 190-203.
Zhang L., et al., "CapSal: Leveraging Captioning to Boost Semantics for Salient Object Detection", Date of Conference: Jun. 15-20, 2019, pp. 6024-6033.

\* cited by examiner

Image 310

Caption 320: Feeling excited today! ☺

Caption 340: Lousy day at work ☹

Result image 330

Result image 350

Image 410

Caption 420: Look at my new laptop! 💻

Caption 440: Carl made it to the event! 👤

Look at my new laptop! 💻

Result image 430

Carl made it to the event! 👤

Result image 450

AUTOMATIC IMAGE PROCESSING BASED ON CAPTION

FIELD

This application is related to image processing. More specifically, this application relates to systems and methods of automatically generating image processing settings for one or more images based on a caption associated with an image.

BACKGROUND

Cameras can apply a variety of image capture and image processing settings to alter how an image looks. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

The large number of different camera settings, and different types of camera settings, can be confusing for users. Oftentimes, users who are less well-versed in camera settings might not be aware of which settings are optimal for which scenarios, or may not understand how to set up their camera to achieve optimal settings for a given scenario, or both.

SUMMARY

Image processing can be improved by generating image processing settings for an image based on a received caption for the image. For instance, the image processing settings may be generated to depict or enhance a mood that is identified in the caption. Alternately or additionally, the image processing settings may be generated to focus attention on or optimize appearance of a particular object depicted in the image based on the caption discussing or otherwise identifying the object. The image is captured and/or processed based on the image processing settings.

In one example, an apparatus for processing image data is provided. The apparatus includes a memory configured to store one or more images captured by an image sensor. The apparatus includes one or more processors coupled to the memory. The one or more processors are configured to perform system operations. The system operations include obtaining a caption for an image, the caption including at least one character corresponding to the image. The system operations also include determining an image processing setting based on the caption. The system operations also include processing the image based on the image processing setting In another example, a method of processing image data is provided. The method includes obtaining a caption for an image, the caption including at least one character corresponding to the image. The method also includes determining an image processing setting based on the caption. The method also includes processing the image based on the image processing setting.

In one example, a non-transitory computer-readable storage medium storing instructions is provided. The instructions, when executed by one or more processors, cause the one or more processors to perform a method. The method includes obtaining a caption for an image, the caption including at least one character corresponding to the image. The method also includes determining an image processing setting based on the caption. The method also includes processing the image based on the image processing setting.

In some aspects, the methods, apparatuses, and computer-readable medium described above further comprise: receiving the image from an image sensor before the image processing setting is determined, wherein processing the image based on the image processing setting includes altering at least a first visual property of a group of pixels within the image. In some aspects, processing the image based on the image processing setting includes adjusting levels associated with the first visual property for each of the group of pixels within the image based on the image processing setting, wherein the first visual property is one of brightness, contrast, saturation, color, hue, tone, sharpness, blur, and filtering.

In some aspects, the methods, apparatuses, and computer-readable medium described above further comprise: receiving the image from an image sensor after the image processing setting is determined. In some aspects, the methods, apparatuses, and computer-readable medium described above further comprise: modifying, based on the image processing setting, an image capture property of an image capture device from being set to a first image capture setting to being set to a second image capture setting before the image is captured by the image sensor of the image capture device, wherein the image is captured by the image sensor of the image capture device while the image capture property of the image capture device is set to the second image capture setting. In some aspects, the image capture property includes at least one of an aperture size, an exposure time, an ISO speed, an analog gain, a flash, a high dynamic range (HDR), a focus, a zoom, and a depth of field.

In some aspects, the methods, apparatuses, and computer-readable medium described above further comprise: determining that the caption includes one or more characters corresponding to a mood, wherein generating the image processing setting based on the caption includes setting the image processing setting based on the mood. In some aspects, the methods, apparatuses, and computer-readable medium described above further comprise: identifying a predetermined image processing setting that corresponds to the mood, wherein setting the image processing setting based on the mood includes setting the image processing setting to the predetermined image processing setting that corresponds to the mood.

In some aspects, the methods, apparatuses, and computer-readable medium described above further comprise: determining that the caption includes one or more characters corresponding to an object depicted in the image, wherein generating the image processing setting based on the caption includes setting the image processing setting based on the object depicted in the image. In some aspects, the methods, apparatuses, and computer-readable medium described above further comprise: identifying a predetermined image processing setting that corresponds to the object depicted in the image, wherein setting the image processing setting based on the object depicted in the image includes setting the image processing setting to the predetermined image processing setting that corresponds to the object depicted in the image.

In some aspects, processing the image based on the image processing setting visually emphasizes a first area of the image over a second area of the image with respect to at least the first visual property, wherein the first visual property includes at least one of brightness, contrast, saturation, color, focus, depth of field, sharpness, and blur.

In some aspects, the methods, apparatuses, and computer-readable medium described above further comprise: determining that the caption includes one or more characters that also appear in a second caption associated with a second image, the second image being processed based on a second image processing setting, wherein generating the image processing setting based on the caption includes setting the image processing setting based on the second image processing setting.

In some aspects, obtaining the caption for the image includes receiving the caption by receiving one or more inputs corresponding to the caption through an input device. In some aspects, obtaining the caption for the image includes identifying the caption based on one or more messages associated with the image.

In some aspects, the methods, apparatuses, and computer-readable medium described above further comprise: receiving a prior image captured by the image sensor before receiving the image captured by the image sensor, wherein obtaining the caption for the image includes generating the caption by identifying one or more objects depicted in the prior image using an object detection algorithm.

In some aspects, generating the image processing setting based on the caption includes receiving the image processing setting from a machine learning model in response to inputting at least a subset of the caption into the machine learning model. In some aspects, the machine learning model is trained based on training data that includes a plurality of images and a plurality of captions that each correspond to at least one of the plurality of images.

In some aspects, the methods, apparatuses, and computer-readable medium described above further comprise: obtaining additional data other than the caption, wherein determining the image processing setting is also based on the additional data, wherein the additional data includes at least one of a time of day during which the image is captured, a location at which the image is captured, a date during which the image is captured, a scheduled event during which the image is captured, a previous image of a scene depicted in the image, a user image of a user holding the image capture device, and a facial expression within another image other than the image.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
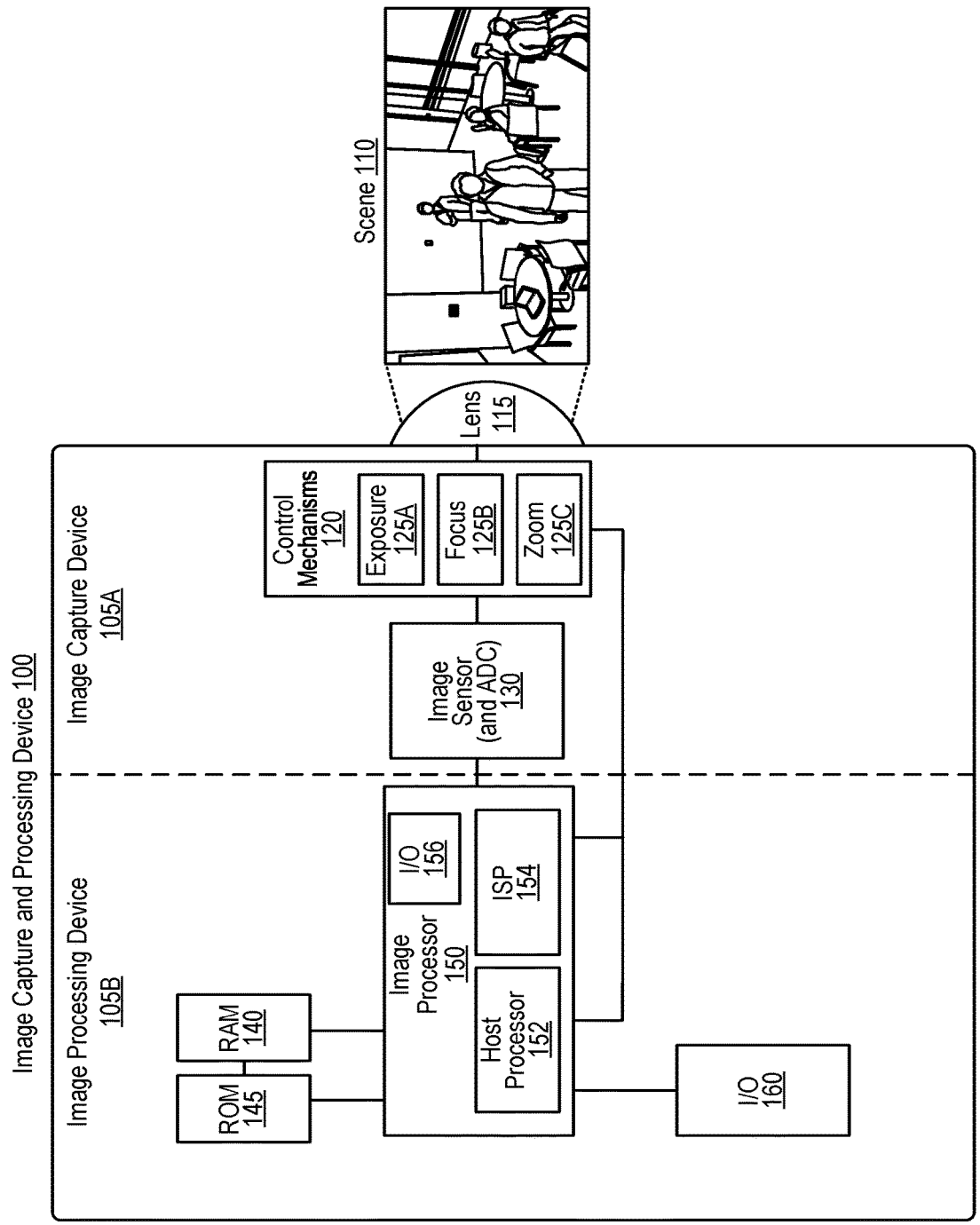
FIG. 1 is a block diagram illustrating an architecture of an image capture and processing device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A large number of image capture and image processing settings are available for cameras. The various settings can be applied by a camera to alter how an image or video looks. In some cases, camera settings can be determined and applied before or during capture of the photograph, such as ISO, exposure time, aperture size, f/stop, shutter speed, focus, and gain. In some cases, camera settings can be used during post-processing of a photograph, such as alterations to contrast, brightness, saturation, sharpness, levels, curves, or colors.

A user can control the settings of a camera based on certain conditions and/or based on the type of photograph or video the user desires. For example, a user may set certain camera settings to enhance depiction of certain moods in a photograph or video. In another example, a user can choose certain settings to capture different types of movements or subjects in a photograph or video. However, because of the large number of different image capture and processing settings, users might not understand what settings are best used in different situations (e.g., to depict a certain mood, to best capture a certain type of object or movement, and/or other situations).

Systems, apparatuses, processes, and computer-readable media are described herein for automatically generating image processing settings for one or more images based on a caption associated with an image. In some examples, an image processing device 105B may receive a caption for an image before, during, or after capture of the image by an image capture device coupled to the image processing device. The image processing device 105B can generate image processing settings based on the caption. In one illustrative example, the image processing device 105B can determine a mood indicated by the caption, and can generate an image processing based on the determined mood. In another illustrative example, the image processing device 105B can determine an object identified in the caption, and can generate an image processing based on the object. In some cases, if the caption is received before image capture, the image processing settings generated by the image processing device 105B may include one or more image capture settings that the image capture device 105A can use when capturing the image, for instance by changing one or more image capture properties controlled by the control mechanisms 120 based on the image capture settings. For example, the image capture device can use the one or more image capture settings to alter exposure, focus, zoom, analog gain, flash, high dynamic range (HDR), depth of field, and/or other image capture properties during image capture. In some cases, the image processing settings can include post-processing settings determined based on a caption. For example, once an image is captured, the image processing device may process the image based on the post-processing settings, for instance by applying filters and/or adjusting gain, brightness, contrast, saturation, colors, and/or other image processing properties. In one illustrative example, brightness and saturation of an image may be altered (during image capture or during post-processing) if the caption indicates a happy or sad mood. In another illustrative example, the focus of an image may be altered (during image capture or during post-processing) to focus on an object identified in a caption.

FIG. 1 is a block diagram illustrating an architecture of an image capture and processing device 100. The image capture and processing device 100 of FIG. 1 includes various components that the image capture and processing device 100 uses to capture and process images of scenes (e.g., an image of a scene 110). The image capture and processing device 100 can capture standalone images (or photographs) and/or can capture videos that include multiple images (or video frames) in a particular sequence. A lens 115 of the device 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be the lens 115) that receives the light from the scene 110 first, with the light then passing through an afocal zoom system between the focusing lens and the image sensor 130 before the light finally reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 610 discussed with respect to the computing device 600. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI), any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/620, read-only memory (ROM) 145/625, a cache 612, a memory unit 615, another storage device 630, or some combination thereof.

The host processor 152 can configure the image sensor 130 with new parameter settings (e.g., via an external control interface such as the I/O ports 156, which can include I2C, I3C, SPI, GPIO, and/or other interfaces as noted above). In one illustrative example, the host processor 152 can update exposure settings used by the image sensor 130 based on internal processing results of an exposure control algorithm from past image frames. The host processor 152 can also dynamically configure the parameter settings of the internal pipelines or modules of the ISP 154 to match the settings of one or more input image frames from the image sensor 130 so that the image data is correctly processed by the ISP 154.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 635, any other input devices 645, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 100 and one or more peripheral devices, over which the device 100 may receive data from the one or more peripheral device and/or transmit data to the one or more peripheral devices. The I/O 160 may include one or more wireless transceivers that enable a wireless connection between the device 100 and one or more peripheral devices, over which the device 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing device 100 may be a single device. In some cases, the image capture and processing device 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing device 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing device 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing device 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing device 100 is shown to include certain components, one of ordinary skill will appreciate that the image capture and processing device 100 can include more components than those shown in FIG. 1. The components of the image capture and processing device 100 can include software, hardware, or one or more combinations of software and hardware. For example, in some implementations, the components of the image capture and processing device 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing device 100.

Figure 2A:
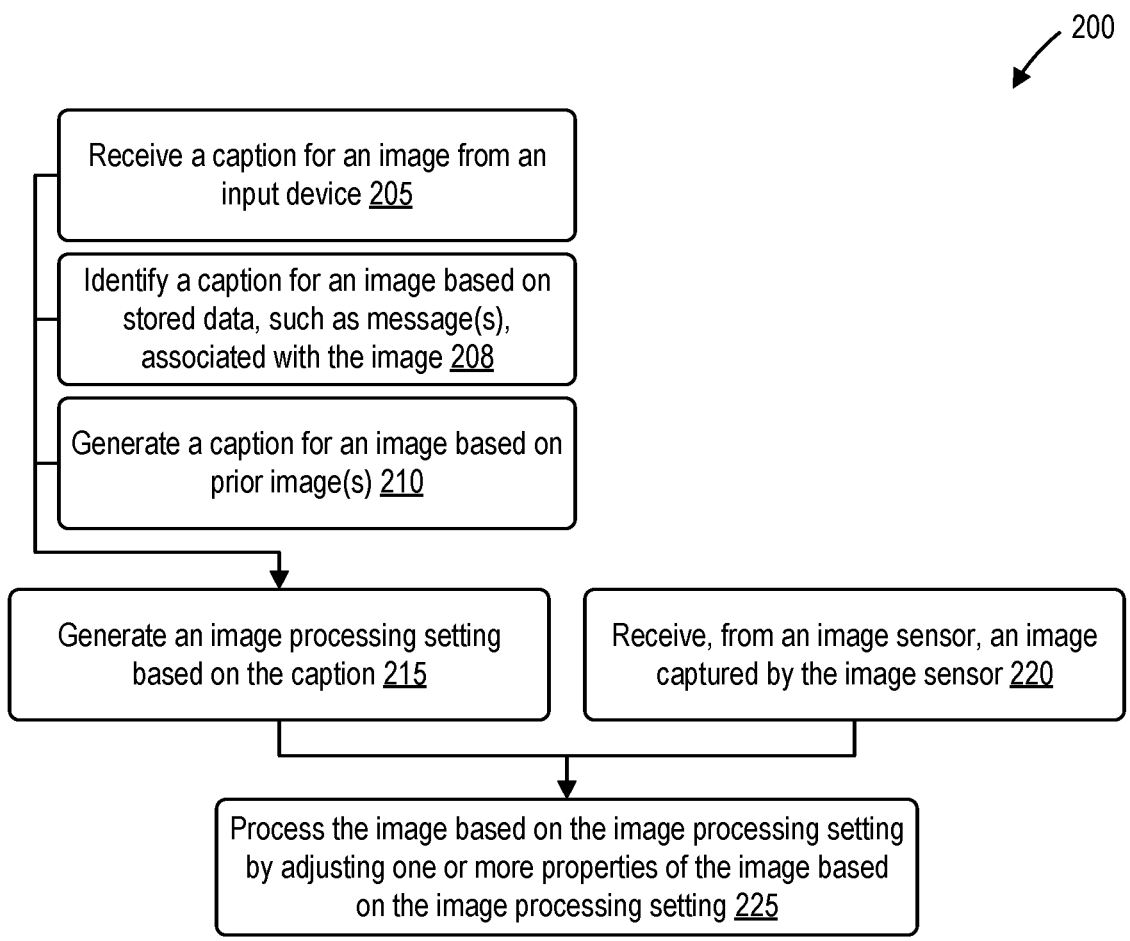
FIG. 2A is a flow diagram illustrating operations for processing an image using an image processing setting that is based on a received caption for the image.

FIG. 2A is a flow diagram illustrating operations for processing an image using an image processing setting that is based on a received caption for the image. The image processing operations 200 of FIG. 2A may be performed by the image capture and processing device 100 or the image processing device 105B of FIG. 1. For simplicity, the operations 200 of FIG. 2A will be discussed as being performed by the image processing device 105B.

At operations 205, 208, and 210, the image processing device 105B obtains a caption for an image. More specifically, at operation 205, the image processing device 105B receives the caption for the image from an input device, which a user may use to input the caption into the image processing device 105B. In some examples, the input device can include a keyboard, keypad, touch-sensitive surface, touchpad, touchscreen, microphone, or some combination thereof.

At operation 208, the image processing device 105B obtains the caption for the image by identifying the caption for the image based on stored data associated with the image. For instance, the stored data may include one or more messages that a user of the image processing device 105B sent or received over a communication service using the image processing device 105B or another computing system 600 coupled to the image processing device 105B. The image may be attached to the messages. The image may be described within these messages, either with the image attached, after the image was already sent in a previous message, or in before the image is sent in a message that anticipates sending of the image. The content of any messages concerning the image, especially any descriptions of the image, may be identified by the image processing device 105B and used by the image processing device 105B as the caption. The communication service may include, for example, email, short messaging service (SMS), multimedia messaging service (MMS), rich communication service (RCS), Apple® iMessage®, Apple® FaceTime®, Google® Hangouts®, Facebook® Messenger®, Microsoft® Skype®, Zoom® Video Communications, WhatsApp®, Instagram®, Instagram® Direct Messages, Twitter® direct messages, Twitter® posts, Facebook® posts, Discord®, Slack®, a messaging client associated with a particular mobile device manufacturer, a messaging client associated with a particular operating system, a messaging client associated with a particular network carrier, a messaging client associated with a particular social media platform, another communication service, or some combination thereof.

At operation 210, the image processing device 105B obtains the caption for the image by generating the caption for the image based on one or more prior images that the image sensor of the image capture device 105A captures before capturing the image. The image processing device 105B may receive the one or more prior images from the image sensor of the image capture device 105A before receiving the image. In some cases, the one or more prior images can depict the same scene as the image. The one or more prior images can be images that are captured in preparation for capturing the image, for instance during an auto-exposure process, an auto-focus process (e.g., PDAF and/or CDAF), or some combination thereof. The one or more prior images can be preview images that are captured and displayed via a display screen of the image processing device 105B to a user so that the user receives a preview of the image before the image is captured, to help the user frame the photo and set certain image capture settings. For instance, the preview images can be captured before the user presses a shutter button, while the user presses the shutter button, shortly after the user presses the shutter button but before the image is captured, or some combination thereof.

For example, the image processing device 105B may generate the caption at step 210 by detecting and classifying what is depicted in the one or more prior images that are captured before the image (e.g., one or more objects that are depicted in the one or more prior images). The image processing device 105B may perform this detection and classification using an object detection algorithm, an object recognition algorithm, an edge detection algorithm, a feature detection algorithm, a feature recognition algorithm, an image classifier, a facial recognition algorithm, a computer vision algorithm, or some combination thereof. For example, the image processing device 105B may determine, using an object detection algorithm, that the one or more prior images depict a woman smiling and a dog running. Based on detecting the woman smiling and the dog running in the one or more prior images, the image processing device 105B may generate the caption "woman smiling and dog running" or "dog running and woman smiling." If the image processing device 105B uses a facial recognition algorithm, the image processing device 105B may further be able to determine the identities of the woman and/or dog, and as a result may generate a caption such as "Jennifer Smith smiling and Fluffy the dog running" or "Fluffy the dog running and Jennifer Smith smiling."

In some examples, the image processing device 105B can alternately generate the caption at step 210 by comparing the one or more prior images visually to one or more databases or other data structures that store a number of images that each have corresponding captions. In some cases, the data structures may include images and captions from one or more social media sources (e.g., social networking websites), news sources (e.g., news websites), stock image sources, photography sources, other data sources, or some combination thereof. For instance, if the image processing device 105B determines that the one or more prior images are visually similar to one or more other images from the data structures that all depict the Eiffel Tower and include captions that include the phrase "vive la France," then the image processing device 105B may generate the caption "vive la France" for the image at step 210. In some cases, the caption may be generated based on a data structure of the user's own previous captions and corresponding previously captured images. In some cases, the caption may be generated based on a data structure of previous captions and corresponding previously captured images corresponding to one or more specific users, such as those corresponding to the user's family members, friends, social media contacts, well-known photographers/artists, celebrities, and so forth.

In some cases, the image processing device 105B may obtain the caption through some a combination of operations 205, 208, and/or 210. In one example, a first part of the caption may be user-input via the input device at operation 205, a second part of the caption may be identified from stored data at operation 208, and a third part of the caption may be generated by the image processing device 105B at operation 210. For example, the image processing device 105 may receive a caption input through the input device by the user, and the image processing device 105 may append appropriate emojis (or other visual glyphs as discussed above) and/or additional "keywords," for instance with hashtags. Additional keywords or visual glyphs added by the image processing device 105 via operation 210 may be based on the caption input through the input device at operation 205, based on the one or more prior images as discussed previously with respect to operation 210, or some combination thereof.

At operation 215, the image processing device 105 generates an image processing setting based on the caption. The image processing setting may be applied in processing an image at operation 225, which occurs after capture of the image at operation 220, as discussed further herein. Application of image processing settings that modify an image after the image is captured may be referred to in some cases as performing "post-processing." In some cases, the image processing setting includes a property adjustment setting, where processing the image based on the image processing setting includes adjusting (e.g., increasing or decreasing) a property of one or more pixels of the image based on the property adjustment setting. For instance, where the property is brightness, the brightness of at least a subset of the pixels of the image is adjusted. Where the property is contrast, the contrast of at least a subset of the pixels of the image is adjusted. Where the property is saturation, the saturation of at least a subset of the pixels of the image is adjusted. Where the property is sharpness or blur, the sharpness or blur of at least a subset of the pixels of the image is adjusted. Where the property is white balance or black balance, the white balance or black balance of at least a subset of the pixels of the image is adjusted. Where the property is color, the color of at least a subset of the pixels of the image is adjusted (e.g., red levels are adjusted, green levels are adjusted, blue levels are adjusted, or some combination thereof). Where the property is tone, the tones of at least a subset of the pixels of the image is adjusted. Where the property is tone, the tonal distribution (e.g., histogram and/or levels) of at least a subset of the pixels of the image is adjusted. Where the property is hue, the hue of at least a subset of the pixels of the image is adjusted. Where the property is digital gain, the digital gain of at least a subset of the pixels of the image is adjusted. The property may be adjusted uniformly across the pixels of the image to which the property adjustment setting of the image processing setting is applied, or the property may be adjusted unevenly so that the property may be increased or decreased more in one area than another, or increased in one area but decreased in another.

In some cases, the image processing setting includes a filter setting, where processing the image based on the image processing setting includes applying a filter to one or more pixels of the image based on the filter setting. The filter may adjust any of the properties discussed above (e.g., brightness, contrast, saturation, sharpness, blur, white balance, black balance, color, tonal distribution, hue, and/or gain) and/or other settings. The filter may apply a high-pass filter, a low-pass filter, a band pass filter, a band stop filter, or another type of filter. The filter may adjust properties uniformly across the pixels of the image to which the filter of the image processing setting is applied, or the filter may adjust properties unevenly across different areas of the image.

In some cases, at operation 215, the image processing device 105 may determine that the caption includes one or more characters corresponding to a mood. The image processing device 105 can generate or set the image processing setting based on the mood. The image processing device 105 may identify the mood based on one or more characters. The one or more characters may be alphanumeric characters. The one or more characters may spell out one or more words and/or may include one or more visual glyphs (e.g., emojis, emoticons, dingbat font symbols, hieroglyphs, Asian characters, Cyrillic characters, Indic scripts, mathematical symbols, arrows, geometric shapes, circuit symbols, technical symbols, currency symbols, and/or other symbols) in the caption. A visual glyph of any of these types can be considered one or more characters. For instance, an emoji, a dingbat font symbol, a hieroglyph, an Asian character, a Cyrillic character, an Indic script character, an arrow, a geometric shape, a circuit symbol, a technical symbol, a currency symbol, or a mathematical symbol is generally a single character. Any non-alphanumeric character in the Unicode standard or another text encoding standard may be considered a visual glyph. In some cases, alphanumeric characters may be considered visual glyphs when they are used in a manner that conveys a meaning other than their ordinary alphanumeric meaning in a caption, such as use of the letter "V" to represent a downward-facing arrow (or part of a downward-facing arrow paired with an "I" or "|" or another character representing a vertical line) rather than part of a word. Alphanumeric characters more commonly used in languages other than the language that the caption is written in may especially be used as visual glyphs. An emoticon can be a single character or can be made up of two or more characters, such as ":)"— which is an emoticon including a colon followed by closed parenthesis that represents a smiling face.

If the caption includes one or more words like "happy," "excited," "exciting," "cheerful," "wow!," or other related terms, and/or includes a smiling face emoji or emoticon, and/or includes another type of symbol (e.g., hieroglyph or Asian character) representing happiness or a related concept, then image processing device 105 may determine that the mood is happy. Based on the happy mood, the image processing device 105 can generate an image processing setting that adjust image properties of one or more pixels of the image to increase brightness, increase contrast, increase saturation (e.g., making colors appear more vibrant), adjust image colors to increase warm tones (e.g., reds, yellows) and decrease cool tones (e.g., blue, green), adjust tonal distributions to decrease brightness of mid-tones, or some combination thereof. In another example, if the caption includes one or more words like "sad," "distraught," "lousy," "upsetting," "oh no!," or other related terms, and/or includes a sad face emoji or emoticon, and/or includes another type of symbol (e.g., hieroglyph or Asian character) representing sadness or a related concept, then image processing device 105 may determine that the mood is sad. Based on the sad mood, the image processing device 105 can generate an image processing setting that adjust image properties of one or more pixels of the image to decrease brightness, decrease contrast, decrease saturation (e.g., to make colors appear less vibrant and/or to make the image greyscale or closer to greyscale), adjust image colors to decrease warm tones (e.g., reds, yellows) and increase cool tones (e.g., blue, green), adjust tonal distributions to increase brightness of mid-tones, or some combination thereof.

In some cases, visual glyphs such as emojis or emoticons may be assigned a higher weight in terms of identifying a mood or object than words, as the mood or object identified in the caption may be more clearly conveyed through a visual glyph than through words. In other cases, words may be assigned a higher weight in terms of identifying a mood or object than visual glyphs, as the mood or object identified in the caption may be more clearly conveyed through words than through a visual glyph.

In some cases, at operation 215, the image processing device 105 may determine that the caption includes one or more characters corresponding to an object. The image processing device 105 can generate or set the image processing setting based on the object. The image processing device 105 may identify the object based on one or more words and/or visual glyphs (e.g., emojis, emoticons, dingbat font symbols, hieroglyphs, Asian characters, Cyrillic characters, Indic scripts, mathematical symbols, arrows, geometric shapes, circuit symbols, technical symbols, currency symbols, and/or other symbols) in the caption. The image processing setting generated by the image processing device 105 may adjust one or more image properties of one or more pixels of the image to emphasize the area of pixels corresponding to the object as depicted in the image, to de-emphasize areas of pixels other than those corresponding to the object, or some combination thereof. In one example, for instance by sharpening pixels corresponding to the object and/or blurring pixels that do not correspond to the object. In some cases, the image processing setting may be used by the image processing device 105 to modify one or more pixels of the image to alter brightness, contrast, saturation, sharpness, blur, white balance, black balance, color, tonal distribution, hue, and/or gain of pixels corresponding to the object. On the other hand, the image processing setting may be used by the image processing device 105 to modify one or more pixels of the image to alter brightness, contrast, saturation, sharpness, blur, white balance, black balance, color, tonal distribution, hue, and/or gain of pixels not corresponding to the object.

For example, if the caption includes a person's name, then the object may be a human being with that name. If the caption includes a word like "man," "woman," "boy," "girl," or other terms related to human beings, and/or includes an emoji or emoticon representing a person, and/or includes another type of symbol (e.g., hieroglyph or Asian character) representing a person, then the object is a person. If the caption includes a word like "running," "jogging," "yoga," "working," "cooking," or other terms related to activities that people perform, and/or includes an emoji or emoticon representing activities that people perform, and/or includes another type of symbol (e.g., hieroglyph or Asian character) representing activities that people perform, then the object may be a person. If the caption includes a word like "dog," "puppy," "husky," "beagle," "corgi," or other related terms, and/or includes an emoji or emoticon representing a dog, and/or includes another type of symbol (e.g., hieroglyph or Asian character) representing a dog, then the object is a dog. If the caption includes a name, the name may be compared to a database to identify who the name refers to, and the object may refer to that specific person (or pet), and the object may be either a person in general, the specific named person, a pet in general, or the specific named pet.

At operation 220, the image processing device 105 receives, from the image sensor of the image capture device 105A, an image captured by the image sensor of the image capture device 105A. While operation 220 is illustrated side by side with operation 215, it should be understood that operation 220 may occur at least partially before operation 215, operation 220 may occur at least partially after operation 215, operation 220 may occur at least partially during operation 215, operation 215 may occur at least partially during operation 220, or some combination thereof. Likewise, operation 220 may occur at least partially before operations 205 and/or 210, operation 220 may occur at least partially after operations 205 and/or 210, operation 220 may occur at least partially during operations 205 and/or 210, operations 205 and/or 210 may occur at least partially during operation 220, or some combination thereof.

At operation 225, the image processing device 105 processes the image that was received at step 220 based on the image processing setting by adjusting one or more properties of the image based on the image processing setting. Furthermore, as discussed further with respect to the operations 250 of FIG. 2B, the image processing setting may include image capture settings that control, set, or adjust properties of the image capture device 105A before and/or during capture of the image.

Figure 2B:
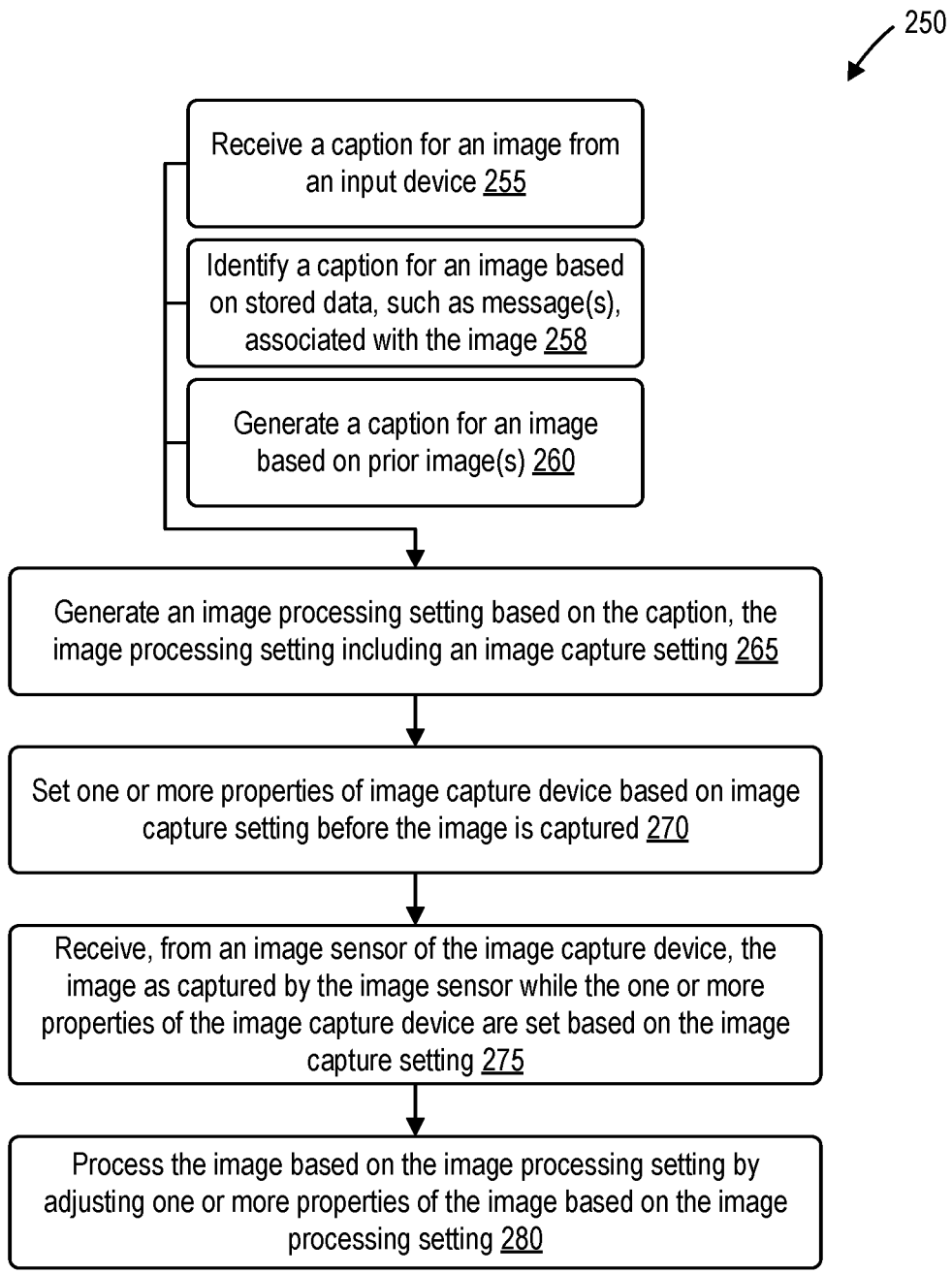
FIG. 2B is a flow diagram illustrating operations for capturing an image using an image capture setting that is based on a received caption for the image.

FIG. 2B is a flow diagram illustrating operations for capturing an image using an image capture setting that is based on a received caption for the image. The image processing operations 250 of FIG. 2B may be performed by the image capture and processing device 100 or the image processing device 105B of FIG. 1. For simplicity, the operations 250 of FIG. 2B will be discussed as being performed by the image processing device 105B.

Operations 255, 258, and 260 of the operations 250 of FIG. 2B are similar to operations 205, 208, and 210 of the operations 200 of FIG. 2A. Specifically, these all concern the image processing device 105B obtaining a caption for the image, such as by receiving the caption via an input device (operations 205 and 255), by identifying the caption based on stored (such as messages) associated with the image (operations 208 and 258), by generating the caption based on one or more prior images (operations 210 and 260), or some combination thereof.

At operation 265, the image processing device 105B generates an image processing setting based on the caption. The image processing setting of operation 265 includes an image capture setting. At operation 270, the image processing device 105B sets one or more properties of the image capture device 105A based on the image capture setting. At operation 275, the image processing device 105B receives, from an image sensor of the image capture device 105A, the image as captured by the image sensor while the one or more properties of the image capture device are set based on the image capture setting. In the operations 250 of FIG. 2B, the caption is received (at operations 255, 258, and/or 260), the image processing setting that includes the image capture setting is determined/generated (at operation 265), and the properties of the image capture device 105A are set based on the image capture setting (at operation 270), all at least partially before and/or at least partially during the capture of the image (at operation 275). The image capture setting may include, for example, an exposure setting, a focus setting, a zoom setting, an analog gain setting, a flash setting, an HDR setting, a depth of field setting, or some combination thereof.

The exposure setting may be input into the exposure control mechanism 125A by the image processing device 105B to adjust exposure-related properties of the exposure control mechanism 125A such as a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or some combination thereof. If the caption identifies a mood, then the image processing device 105B may set the exposure setting to adjust the exposure (e.g., increase or decrease the exposure) based on the mood. For instance, if the mood is a happy mood, the image processing device 105B may set the exposure setting to increase the exposure to effectively increase the brightness of the image. On the other hand, if the mood is a sad mood, the image processing device 105B may set the exposure setting to decrease the exposure to effectively decrease the brightness of the image.

If the caption identifies an object depicted in the image, then the image processing device 105B may set the exposure setting to adjust the exposure (e.g., increase or decrease the exposure) based on the object. For instance, if the caption includes the terms "moon," "stars," "milky way," "nighttime," "night sky," "comet," "falling star," "meteor shower," "astronomy," "Mars," "Venus," "Mercury," "Saturn," "Jupiter," or similar terms or analogous visual glyphs, then the image processing device 105B may set the exposure setting to increase the exposure so that more light from objects in the night sky reaches the image sensor 130, and therefore the objects in the night sky are more visible and appear more clearly. On the other hand, if the caption includes the terms "sunshine," "sunny," "sunset," "sunrise," "lamp," "spotlight," or similar terms or analogous visual glyphs, then the image processing device 105B may set the exposure setting to decrease the exposure so that the image sensor is not overloaded with sunlight or light from other heavy light sources so that the image does not appear overexposed and washed out. If the caption includes the terms "traffic," "metro," "city," "urban," or similar terms or analogous visual glyphs, then the image processing device 105B may set the exposure setting to increase the exposure time to give cars and/or headlights a motion blur that evokes a feeling of movement. On the other hand, if the caption includes the terms "sports," "throw," "score," "goal," "player," "MVP," "wildlife," "cheetah," "cat," "dog," "kids," "children," "boy," "girl" or similar terms or analogous visual glyphs, then the image processing device 105B may set the exposure setting to decrease the exposure time so that sports players, wildlife, pets, or children that are making rapid movements do not appear blurry due to motion blur.

The focus setting may be input into the focus control mechanism 125B by the image processing device 105B to adjust focus-related properties of the focus control mechanism 125B, such as the position of one or more lenses relative to the position of the image sensor 130 and/or to one or more other lenses of the image capture device 105A. For example, the focus control mechanism 125B may control, based on the focus setting, the distance between the image sensor 130 and one or more lenses (e.g., including lens 115), and/or the distance between one or more lenses image capture device 105A of the and one or more other lenses of the image capture device 105A. The focus setting may be determined based on CDAF, PDAF, or some combination thereof. If the caption identifies a mood, the image processing device 105B may set the focus setting and therefore adjust the focus based on the mood. For instance, if the mood is a sad mood, the image processing device 105B may set the focus setting and therefore adjust the focus so that the image is intentionally slightly out of focus, giving the image a "foggy" or "misty-eyed" appearance. On the other hand, if the mood is a happy mood, the image processing device 105B may set the focus setting and therefore adjust the focus so that the image is in focus. If the caption identifies an object depicted in the image, then the image processing device 105B may set the focus setting and therefore adjust the focus based on the object, such as by intentionally adjusting (e.g., improving or reducing) focus on the object. For instance, if the object is a person who is depicted in the foreground of the image, the image processing device 105B may set the focus setting and therefore adjust the focus to improve focus on the person, making the person appear more clearly/sharply in the image, while focus on other objects in the image, such as mountains in the background of the image, may decrease, making the mountains appear more blurry in the image. On the other hand, if the object is a mountain that is depicted in the background of the image, the image processing device 105B may set the focus setting and therefore adjust the focus to improve focus on the mountain, making the mountain appear more clearly/sharply in the image, while focus on other objects in the image, such as a person(s) in the foreground of the image, may decrease, making the person(s) appear more blurry in the image.

The zoom setting may be input into the zoom control mechanism 125C by the image processing device 105B to adjust zoom-related properties of the zoom control mechanism 125C, such as the position of one or more lenses relative one or more other lenses of the image capture device 105A and/or to the image sensor 130 of the image capture device 105A. In other words, the zoom control mechanism 125C may control, based on the zoom setting, the distance between one or more lenses image capture device 105A of the and one or more other lenses of the image capture device 105A, and/or the distance between the image sensor 130 and one or more lenses (e.g., including lens 115). If the caption identifies a mood, then the image processing device 105B may set the zoom setting to adjust the zoom (e.g., zoom in or zoom out) based on the mood. For instance, if the mood is a sad mood, the image processing device 105B may set the zoom setting to zoom out to make a person in the image appear smaller relative to the rest of the image. On the other hand, if the mood is a happy mood, the image processing device 105B may set the zoom setting to zoom in to make a person in the image appear larger relative to the rest of the image. If the caption identifies an object depicted in the image, then the image processing device 105B may set the zoom setting to adjust the zoom (e.g., zoom in or zoom out) based on the object, such as by intentionally adjusting zoom (e.g., zooming in or zooming out) to optimally frame the object. For instance, if the object is a person, and the entire person is visible in the image along with background all around the person in at least some zoom settings, then the image processing device 105B may set the zoom setting to adjust the zoom to minimize space around the person so that the person fills up a majority of at least one dimension of the image (e.g., the height of the image or the width of the image). Alternately, if the object is a person, then the image processing device 105B may set the zoom setting to adjust the zoom to frame the person's face or bust (e.g., shoulders, chest and face). On the other hand, if the object is a large group, or a scene in nature such as the sky or a beach photo, then the image processing device 105B may set the zoom setting to zoom out to capture more of the group or the scene.

The analog gain setting may be input into the image sensor 130 by the image processing device 105B to adjust (e.g., increase or decrease) the analog gain applied to the data from the photodiodes of the image sensor 130 in capturing the image. If the caption identifies a mood, then the image processing device 105B may set the analog gain setting to adjust the analog gain (e.g., increase or decrease the analog gain) based on the mood. For instance, if the mood is a happy mood, the image processing device 105B may set the analog gain setting to increase the analog gain to effectively increase the brightness of the image. On the other hand, if the mood is a sad mood, the image processing device 105B may set the analog gain setting to decrease the analog gain to effectively decrease the brightness of the image. If the caption identifies an object depicted in the image, then the image processing device 105B may set the analog gain setting to adjust the analog gain (e.g., increase or decrease the analog gain) based on the object. For instance, if the caption includes the terms "moon," "stars," "milky way," "nighttime," "night sky," "comet," "falling star," "meteor shower," "astronomy," "Mars," "Venus," "Mercury," "Saturn," "Jupiter," or similar terms or analogous visual glyphs, then the image processing device 105B may set the analog gain setting to increase the analog gain so that objects in the night sky appear brighter, and therefore the objects in the night sky are more visible and appear more clearly. On the other hand, if the caption includes the terms "sunshine," "sunny," "sunset," "sunrise," "lamp," "spotlight," or similar terms or analogous visual glyphs, then the image processing device 105B may set the analog gain setting to decrease the analog gain so that sunlight or light from other heavy light sources appear dimmer, and therefore more clearer. In some cases, image processing device 105B may set the analog gain setting based on the exposure setting. For instance, if the exposure setting indicates a high exposure (e.g., a long exposure time, a wide aperture, and/or a high ISO setting), then the image processing device 105B may set the analog gain setting to decrease analog gain to reduce brightness to compensate for the high brightness brought about by the high exposure. On the other hand, if the exposure setting indicates a low exposure (e.g., a short exposure time, a small aperture, and/or a low ISO setting), then the image processing device 105B may set the analog gain setting to increase analog gain to increase brightness to compensate for the low brightness brought about by the low exposure.

Additional image capture settings may be input into the control mechanisms 120 and/or image sensor 130 by the image processing device 105B, such as settings adjusting flash, HDR, depth of field, and/or other image capture properties.

In some cases, the image processing device 105B may generate the image processing setting based on the caption and based on additional information, for instance based on a geographical location at which the image was captured or one or more prior images were captured, on other metadata of the image or of one or more prior images, on objects identified in the image or in one or more prior images, or some combination thereof. For instance, in some cases, the image processing device 105B may generate the image processing setting to match a second image processing setting of a second image that was captured in a similar geographical location as the image was captured, and/or that was captured with a same type of image capture device 105A. In this way, users can recreate iconic photos in specific areas, especially if a caption associated with the iconic photo is used.

In some cases, the image processing device 105B may generate the image processing setting based on a machine learning model generated by a machine learning algorithm trained using training data that includes other images with known image processing settings, and captions (and in some cases metadata) corresponding to each of those other images. For instance, the machine learning algorithm may be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, a deep learning algorithm, or some combination thereof.

In some cases, the image processing device 105B may identifying a predetermined image processing setting corresponding to a mood or object identified by the caption (e.g., from a data structure that associates different moods or objects to different a predetermined image processing settings). The image processing device 105B may set the image processing setting to be this predetermined image processing setting corresponding to the mood or object.

At operation 280, the image processing device 105B additionally processes the image based on the image processing setting by adjusting one or more properties of the image based on the image processing setting. The image processing setting may, at least in some cases, include the types of image processing settings discussed with respect to operations 215 and 225 of the operations 200 of FIG. 2A in addition to the image capture setting. The image processing device 105B may thus process the image at operation 280 in any way that is described above with respect to operations 215 and 225 of the operations 200 of FIG. 2A after the image is captured.

In some cases, the image processing settings—including the image capture settings—may be generated by the image processing device 105B based on image processing settings (in some cases including image capture settings) used for other images that are visually similar to the image (and/or to the prior images of operations 210 and 260), that have captions similar to the caption for the image (received at operations 205, 208, 210, 255, 258, and/or 260), or some combination thereof. These other images, and their captions, may be from one or more databases or other data structures that store a number of images that each have corresponding captions. In some cases, the data structures may include images and captions from one or more social media sources (e.g., social networking websites), news sources (e.g., news websites), stock image sources, photography sources, other data sources, or some combination thereof. For instance, if the image processing device 105B determines that the image and/or the caption are similar to a second image and/or corresponding caption, the image processing device 105B may generate the image processing settings to be equal to or based on secondary image processing settings (in some cases including secondary image capture settings) used for that second image. In some cases, if multiple other images and/or corresponding captions are similar to the image and/or the caption, the image processing device 105B may generate the image processing setting (in some cases including the image capture setting) based on one or more average values, one or more minimum values, and/or one or more maximum values of the values in the other image processing settings for those other images. In some cases, the image processing settings may be generated based on a data structure of the user's own previous captions and corresponding previously captured images (and the image processing settings that were used for to capture and/or process those images). In some cases, the image processing settings may be generated based on a data structure of previous captions and corresponding previously captured images (and the image processing settings that were used for to capture and/or process those images) corresponding to one or more specific users, such as those corresponding to the user's family members, friends, social media contacts, well-known photographers/artists, celebrities, and so forth.

In some cases, the image processing settings—including the image capture settings—may be generated based on additional data other than the caption instead of, or in addition to, being based on the caption. The additional data may include time of day, location (as identified by a GNSS receiver or other positioning receiver of the image capture device), other images captured by one or more image sensors of the image capture device, a calendar date, a schedule, an analysis by the image processing device 105B of any of these types of data, or some combination thereof. For instance, the image processing settings for an image may be determined based on the caption and/or whether the image is being captured during daytime, nighttime, sunrise, sunset, or dusk. The image processing settings for an image may be determined based on the caption and/or whether the image is being captured indoors or outdoors, or near any well-known landmark that is best photographed using certain settings. The image processing settings for an image may be determined based on the caption and/or the user's calendar and/or schedule. If the user's calendar or schedule indicates that the user is scheduled to be in a particular location and/or seeing a particular person or event, then the image processing settings may be set with the assumption that the image is of the particular location and/or the particular person or event. For instance, if the user's calendar or schedule indicates that the user is going stargazing during a particular block of time, then images captured during that time may be processed to emphasize the nighttime sky and/or anything discussed in the caption.

The image processing settings for an image may be determined based on the caption and/or another image captured by the same image capture device 105A. The other image may be a previous image captured by the same image sensor of the image capture device 105A before the image in question is captured. For instance, a mood may be determined in part by identifying whether people depicted in such a previous image are smiling/laughing (suggesting a happy mood), frowning/crying (suggesting a sad mood), angry (suggesting an angry mood), or showing some other emotion based on facial analysis. The other image may be an image captured by a different image sensor of the image capture device 105A. For instance, while a user is aiming a rear-facing camera on the rear of the image capture device 105A at the subject, a front-facing camera on the front of the image capture device 105A may capture an image of the user, and a mood may be determined in part by analyzing the user's face and determining the user's emotional state while the user is instructing the image capture device 105A to capture the image. The user may be smiling/laughing (suggesting a happy mood), frowning/crying (suggesting a sad mood), angry (suggesting an angry mood), or showing some other emotion based on facial analysis.

Any of the types of additional data discussed above may also be analyzed and used to generate or add to the caption as well. For instance, if the user's location indicates that the user is in Paris, France, the word "Paris," a tag such as "#paris," or a visual glyph such as a French flag may be used as the caption or appended to an existing caption. If the time of day and location of the image capture device 105A indicates that the sun is setting at the location of the image capture device 105A at or around the time of capture of the image, then the word "sunset," a tag such as "#sunset," or a visual glyph of a sun or sunset may be used as the caption or appended to an existing caption. If the user's calendar or schedule indicates that the user is scheduled to attend a Mardi Gras festival at or around the time of capture of the image, then the phrase "Mardi Gras," a tag such as "#mardigras" or "#festival," or a visual glyph representing a party or festival may be used as the caption or appended to an existing caption. If analysis of a prior image captured by the same image sensor of the image capture device 105A as the image includes a person smiling, then the word "happy," a tag such as "#happy," or a visual glyph of a person smiling may be used as the caption or appended to an existing caption. If analysis of an image captured by a different image sensor of the image capture device 105A as the image sensor that captures the image indicates that the user of the image capture device 105A was crying at or around the time of capture of the image that is being captioned, then the word "sad," a tag such as "#sad," or a visual glyph of a person crying may be used as the caption or appended to an existing caption.

Figure 3:
FIG. 3 is a conceptual diagram illustrating processing of the same image using two different image processing settings that are each based on different captions for the image that evoke different moods.
Figure 3:
Figure 3:
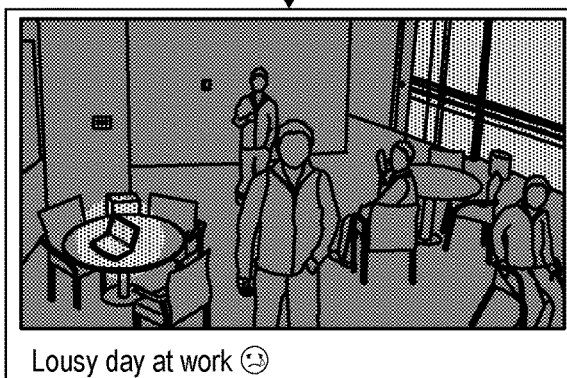

FIG. 3 is a conceptual diagram illustrating processing of the same image using two different image processing settings that are each based on different captions for the image that evoke different moods. In particular, an image 310 depicts a room with four persons, a laptop, and a window. The four persons are somewhat shaded, while the laptop and window are more illuminated.

Two different captions are illustrated, representing receipt of these captions by the image processing device 105B. The first caption 320 reads "Feeling excited today! ☺." The mood in the first caption 320 is happy and/or excited, as the image processing device 105B may determine based on the word "excited" in the first caption 320, the smiling face emoji ("☺") in the first caption 320, the use of the exclamation mark in the first caption 320, or some combination thereof. Based on the first caption 320 and in particular the happy/excited mood, the image processing device 105B generates a first image processing setting and processes the image 310 based on the first image processing setting by applying the first image processing setting to the image 310, thereby generating the first result image 330 from the image 310 and the first processing setting. While a majority of the image 310 appears shaded, the first result image 330 does not, indicating that the image processing setting included a setting to increase brightness after capture of the image (e.g. via post-processing), during capture of the image (e.g., by increasing exposure and/or analog gain), or both. The first result image 330 also includes a variety of different colors and/or hues and/or tones (the different colors/hues/tones illustrated in FIG. 3 as different patterns of black and white), for example with the different articles of clothing and the laptop having noticeably different colors and/or hues and/or tones compared to the background, that do not appear to be distinct in the image 310, indicating that the image processing setting included a setting to increase saturation and/or to alter colors and/or hues and/or tonal distributions.

The second caption 340 reads "Lousy day at work ☹." The mood in the second caption 340 is sad and/or dejected, as the image processing device 105B may determine based on the word "Lousy" in the second caption 340, the sad/crying face emoji ("☹") in the second caption 340, the lack of any punctuation in the second caption 340, or some combination thereof. Based on the second caption 340 and in particular the sad/dejected mood, the image processing device 105B generates a second image processing setting. The image processing device 105B processes the image 310 based on the second image processing setting by applying the second image processing setting to the image 310. As a result of applying the second image processing setting to the image 310, the second result image 350 is generated. While the image 310 includes some areas that are not shaded (e.g., the window and the area illuminated by the laptop screen) and some areas that are (e.g., all other areas), the entire second result image 350 appears shaded, though the window and the area illuminated by the laptop screen are shaded lightly in the second result image 350 while all other areas in the second result image 350 are shaded more darkly than in the image 310. This indicates that the image processing setting included a setting to decrease brightness after capture of the image (e.g. via post-processing), during capture of the image (e.g., by decreasing exposure and/or analog gain), or both.

The image 310 may be the image received by the image processing device 105B in operations 220 and/or 275. Alternately, the image 310 may be a prior image captured (in some cases temporarily) before capture of the image of operations 220 and/or 275, as in the one or more prior images in operations 210 and/or 260. The image 310 may be a prior image even if the caption is received by the image processing device 105B from an input device as in operations 205 and/or 255, or identified based on stored data associated with the image as in operations 208 and/or 258. The resulting images 330 and/or 350 may be the processed image output by the image processing device 105B as a result of the image processing of operations 225 and/or 280. The resulting images 330 and/or 350 may be the image received by the image processing device 105B as a result of the image capture using the image capture setting of operation 275. The first caption 320 and/or the second caption 340 may be received as discussed with respect to any combination of operations 205, 208, 210, 255, 258, and/or 260.

Figure 4:
FIG. 4 is a conceptual diagram illustrating processing of the same image using two different image processing settings that are each based on different captions for the image that identify different objects.
Figure 4:
Figure 4:

FIG. 4 is a conceptual diagram illustrating processing of the same image using two different image processing settings that are each based on different captions for the image that identify different objects. Two different captions are illustrated, representing receipt of these captions by the image processing device 105B. The first caption 420 reads "Look at my new laptop! 💻." The first caption 420 identifies a first object, namely a laptop, which the image processing device 105B may determine based on the word "laptop" in the first caption 420, the laptop emoji ("💻") in the first caption 420, or some combination thereof.

Based on the first caption 420 and the identification of the first object (the laptop), the image processing device 105B generates a first image processing setting. The image processing device 105B processes the image 410 based on the first image processing setting by applying the first image processing setting to the image 410, thereby generating the first result image 430 from the image 410 and the first processing setting. The image processing device 105B may generate the first image processing setting by first identifying the laptop in the image 410 using an object detection algorithm, an object recognition algorithm, an edge detection algorithm, a feature detection algorithm, a feature recognition algorithm, an image classifier, a facial recognition algorithm, a computer vision algorithm, or some combination thereof. The image processing device 105B may generate the first image processing setting to be one that emphasizes an area with the laptop and/or that de-emphasizes all other areas, or that de-emphasizes one or more other areas that do not have the laptop. If the image 410 includes more than one laptop, then the image processing device 105B may generate the first image processing setting to emphasize all of the laptops, or can select one of them to emphasize, for example if context in the caption allows the image processing device 105B to identify which laptop should be emphasized (e.g., if the caption identifies a brand of the laptop and/or a color of the laptop and/or a name on the laptop). The image 410 includes no shading. In contrast, the first result image 430 is shaded, with only a single area including the first object (the laptop) having no shading.

The second caption 440 reads "Carl made it to the event! 👨." The second caption 440 identifies a second object, namely a human being named Carl, which the image processing device 105B may determine based on the word "Carl" in the second caption 440, the man emoji ("👨") in the second caption 440, or some combination thereof. Based on the second caption 440 and in particular the identification of the second object (Carl), the image processing device 105B generates a second image processing setting and processes the image 410 based on the second image processing setting by applying the second image processing setting to the image 410, thereby generating the second result image 450 from the image 410 and the second processing setting. The image processing device 105B may generate the second image processing setting by first identifying the Carl in the image 410 using an object detection algorithm, an object recognition algorithm, an edge detection algorithm, a feature detection algorithm, a feature recognition algorithm, an image classifier, a facial recognition algorithm, a computer vision algorithm, or some combination thereof. The image processing device 105B may generate the second image processing setting to be one that emphasizes an area with Carl and/or that de-emphasizes all other areas, or that de-emphasizes one or more other areas that do not have Carl. The image 410 includes no shading. In contrast, the second result image 450 is shaded, with only a single area including the second object (Carl) having no shading.

In the context of the first result image 430 and the second result image 450 of FIG. 4, areas with shading indicate areas that are de-emphasized by the image processing device 105B in applying the first or second image processing setting, while areas without shading indicate areas that are emphasized by the image processing device 105B in applying the first or second image processing setting. In applying the first or second image processing setting, the image processing device 105B may decrease brightness of the de-emphasized (shaded) areas and/or increase brightness of the emphasized (not shaded) areas of the image 410 to produce the first result image 430 and the second result image 450, helping the emphasized (not shaded) areas to stand out while the de-emphasized (shaded) areas appear dimmed. In applying the first or second image processing setting, the image processing device 105B may increase brightness of the de-emphasized (shaded) areas and/or decrease brightness of the emphasized (not shaded) areas of the image 410 to produce the first result image 430 and the second result image 450, helping the emphasized (not shaded) areas to stand out while the de-emphasized (shaded) areas appear washed out with light. In applying the first or second image processing setting, the image processing device 105B may blur the de-emphasized (shaded) areas and/or sharpen the emphasized (not shaded) areas of the image 410 to produce the first result image 430 and the second result image 450, via post-processing and/or via the focus setting, helping the emphasized (not shaded) areas to stand out as clear and/or sharp and/or focused while the de-emphasized (shaded) areas appear blurry and/or unclear and/or unfocused.

The image 410 may be the image received by the image processing device 105B in operations 220 and/or 275. Alternately, the image 410 may be a prior image captured (in some cases temporarily) before capture of the image of operations 220 and/or 275, as in the one or more prior images discussed with respect to operations 210 and/or 260. The image 410 may be a prior image even if the caption is received by the image processing device 105B from an input device as in operations 205 and/or 255, or identified based on stored data associated with the image as in operations 208 and/or 258. The resulting images 430 and/or 450 may be the processed image output by the image processing device 105B as a result of the image processing of operations 225 and/or 280. The resulting images 430 and/or 450 may be the image received by the image processing device 105B as a result of the image capture using the image capture setting of operation 275. The captions 420 and/or 440 may be received as discussed with respect to any combination of operations 205, 208, 210, 255, 258, and/or 260.

The object detection and/or recognition algorithm can be performed using any suitable object recognition and/or detection technique. In some implementations, the object detection and/or recognition algorithm applied by the image processing device 105B may include and/or incorporate an image detection and/or recognition algorithm, an object detection and/or recognition algorithm, a facial detection and/or recognition algorithm, a feature detection and/or recognition algorithm, an edge detection algorithm, a boundary tracing function, or some combination thereof. Object detection is a technology used to detect (or locate) objects from an image or video frame. Detected objects can be represented using bounding regions that identify the location and/or approximate boundaries of the object (e.g., a face) in the image or video frame. A bounding region of a detected object can include a bounding box, a bounding circle, a bounding ellipse, a bounding polygon, or any other suitably-shaped region representing and/or including a detected object. Object detection and/or recognition can be used to identify a detected object and/or to recognize and classify the detected object into a category or type of object. For instance, feature recognition may identify a number of edges and corners in an area of the scene. Object detection may detect that the detected edges and corners in the area all belong to a single object. Object detection and/or object recognition and/or face detection may identify that the object is a human face. Object recognition and/or face recognition may further identify the identity of the person corresponding to that face.

In some implementations, the object detection and/or recognition algorithm can be performed using any suitable object recognition and/or detection technique. In some implementations, the object detection and/or recognition algorithm can be based on a machine learning model trained using a machine learning algorithm on images of the same types of objects and/or features that may extract features of the image and detect and/or classify the object comprising those features based on the training of the model by the algorithm. For instance, the machine learning algorithm may be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, a deep learning algorithm, or some combination thereof.

In some implementations, the object detection and/or recognition algorithm can be based on a machine learning model trained using a machine learning algorithm on images of the same types of objects and/or features that may extract features of the image and detect and/or classify the object comprising those features based on the training of the model by the algorithm. For instance, the machine learning algorithm may be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, a deep learning algorithm, or some combination thereof.

In some implementations, a computer vision-based object detection and/or recognition technique can be used. Different types of computer vision-based object detection algorithms can be used. In one illustrative example, a template matching-based technique can be used to detect one or more hands in an image. Various types of template matching algorithms can be used. One example of a template matching algorithm can perform Haar or Haar-like feature extraction, integral image generation, Adaboost training, and cascaded classifiers. Such an object detection technique performs detection by applying a sliding window (e.g., having a rectangular, circular, triangular, or other shape) across an image. An integral image may be computed to be an image representation evaluating particular regional features, for example rectangular or circular features, from an image. For each current window, the Haar features of the current window can be computed from the integral image noted above, which can be computed before computing the Haar features.

The Harr features can be computed by calculating sums of image pixels within particular feature regions of the object image, such as those of the integral image. In faces, for example, a region with an eye is typically darker than a region with a nose bridge or cheeks. The Haar features can be selected by a learning algorithm (e.g., an Adaboost learning algorithm) that selects the best features and/or trains classifiers that use them, and can be used to classify a window as a face (or other object) window or a non-face window effectively with a cascaded classifier. A cascaded classifier includes multiple classifiers combined in a cascade, which allows background regions of the image to be quickly discarded while performing more computation on object-like regions. Using a face as an example of a body part of an external observer, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face (or other object), the window will be labeled as a candidate for being a hand (or other object). After all the windows are detected, a non-max suppression algorithm can be used to group the windows around each face to generate the final result of one or more detected faces.

Figure 5:
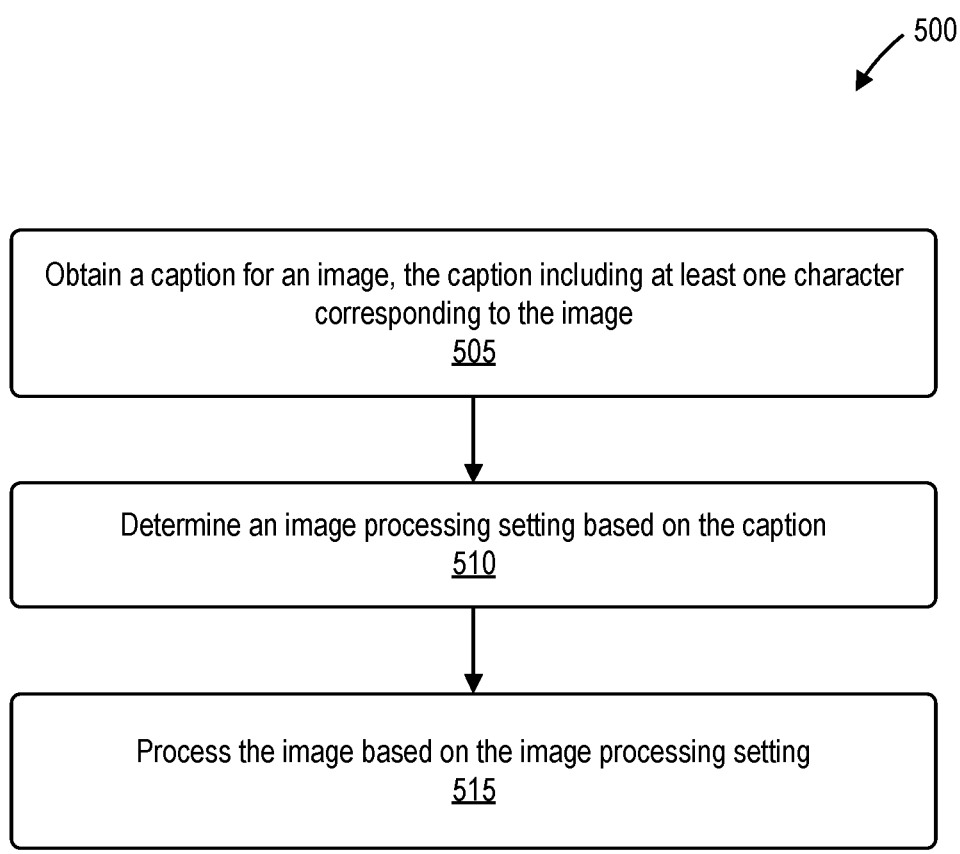
FIG. 5 is a flow diagram illustrating an example of a process for processing image data.

FIG. 5 is a flowchart illustrating an example of a process 500 of processing image data using the techniques described herein. At block 505, the process 500 includes obtaining a caption for an image, the caption including at least one character corresponding to the image. Obtaining the caption for the image can include receiving the caption by receiving one or more inputs corresponding to the caption through an input device. For example, a user may enter the caption through an input device such as a keyboard, keypad, or touchscreen. Obtaining the caption for the image can also include identifying the caption based on one or more messages associated with the image. These messages may include, for example, emails, text messages, or other types of messages having one or more characters that are stored locally on the image capture device 105A and/or the image processing device 105B, or that are accessible over a network by the image capture device 105A and/or the image processing device 105B.

In some cases, the process 500 includes receiving a prior image captured by the image sensor 130 before receiving the image captured by the image sensor 130. Obtaining the caption for the image, in such cases, includes generating the caption by identifying one or more objects depicted in the prior image using an object detection algorithm.

At block 510, the process 500 includes determining an image processing setting based on the caption. In some cases, the process 500 includes determining that the caption includes one or more characters corresponding to a mood. Generating the image processing setting based on the caption may include setting the image processing setting based on the mood. In some cases, the process 500 may include identifying a predetermined image processing setting that corresponds to the mood. Setting the image processing setting based on the mood can include setting the image processing setting to the predetermined image processing setting that corresponds to the mood.

In some cases the process 500 includes determining that the caption includes one or more characters corresponding to an object depicted in the image. Generating the image processing setting based on the caption may include setting the image processing setting based on the object depicted in the image. In some cases, the process 500 may include identifying a predetermined image processing setting that corresponds to the object depicted in the image. Setting the image processing setting based on the object depicted in the image can include setting the image processing setting to the predetermined image processing setting that corresponds to the object depicted in the image.

In some cases the process 500 includes determining that the caption includes one or more characters that also appear in a second caption associated with a second image, the second image being processed based on a second image processing setting. Generating the image processing setting based on the caption can include setting the image processing setting based on the second image processing setting.

In some cases, generating the image processing setting based on the caption includes receiving the image processing setting from a machine learning model in response to inputting at least a subset of the caption into the machine learning model. The process 500 may include generating the image processing setting using the machine learning model as well. The machine learning model may run on the image capture device 105A, the image processing device 105B, another computing system 600 communicatively coupled to one of these devices (e.g., a remote server), or some combination thereof. In some cases, the machine learning model is trained based on training data that includes a plurality of images and a plurality of captions that each correspond to at least one of the plurality of images.

In some cases, the process 500 includes obtaining additional data other than the caption, wherein determining the image processing setting is also based on the additional data. The additional data can include at least one of a time of day during which the image is captured, a location at which the image is captured, a date during which the image is captured, a scheduled event during which the image is captured, a previous image of a scene depicted in the image, a user image of a user holding the image capture device, a facial expression within another image other than the image, any other type of data discussed herein, or some combination thereof. In some cases, the process 500 includes generating the caption based on such additional data.

At block 515, the process 500 includes processing the image based on the image processing setting. Processing the image based on the image processing setting can visually emphasize a first area of the image over a second area of the image with respect to at least the first visual property. The first visual property can include at least one of brightness, contrast, saturation, color, focus, depth of field, sharpness, blur, any other image capture or image processing property mentioned herein, or some combination thereof.

The process 500 may also include receiving the image from an image sensor 130 of the image capture device 105A. In some cases, the image may be received from the image sensor before the image processing setting is determined. In such a case, any image capture settings in the image processing setting cannot be changed before capturing the image, since the image is already captured. Processing the image based on the image processing setting here in this case can include altering at least a first visual property of a group of pixels within the image. For instance, processing the image based on the image processing setting can include adjusting levels associated with the first visual property for each of the group of pixels within the image based on the image processing setting, wherein the first visual property is one of brightness, contrast, saturation, color, hue, tone, sharpness, blur, filtering, or some combination thereof.

In contrast to the above paragraph, the image from an image sensor can be received after the image processing setting is determined. In this case, the image processing setting can include image capture settings that may be applied during capture of the image. The process 500 can include modifying, based on the image processing setting, an image capture property of an image capture device 105A from being set to a first image capture setting to being set to a second image capture setting before the image is captured by the image sensor 130 of the image capture device 105A, wherein the image is captured by the image sensor 130 of the image capture device while the image capture property of the image capture device is set to the second image capture setting The image capture property can include at least one of an aperture size, an exposure time, an ISO speed, an analog gain, a flash, a high dynamic range (HDR), a focus, a zoom, a depth of field, or some combination thereof.

In some examples, the processes described herein (e.g., process 500 and/or other process described herein) may be performed by a computing device or apparatus. In one example, the process 500 can be performed by the image processing device 105B of FIG. 1. In another example, the process 500 can be performed by the image capture and processing device 100 of FIG. 1. In another example, the process 500 can be performed by a computing device with the computing device architecture 600 shown in FIG. 6. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 500. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
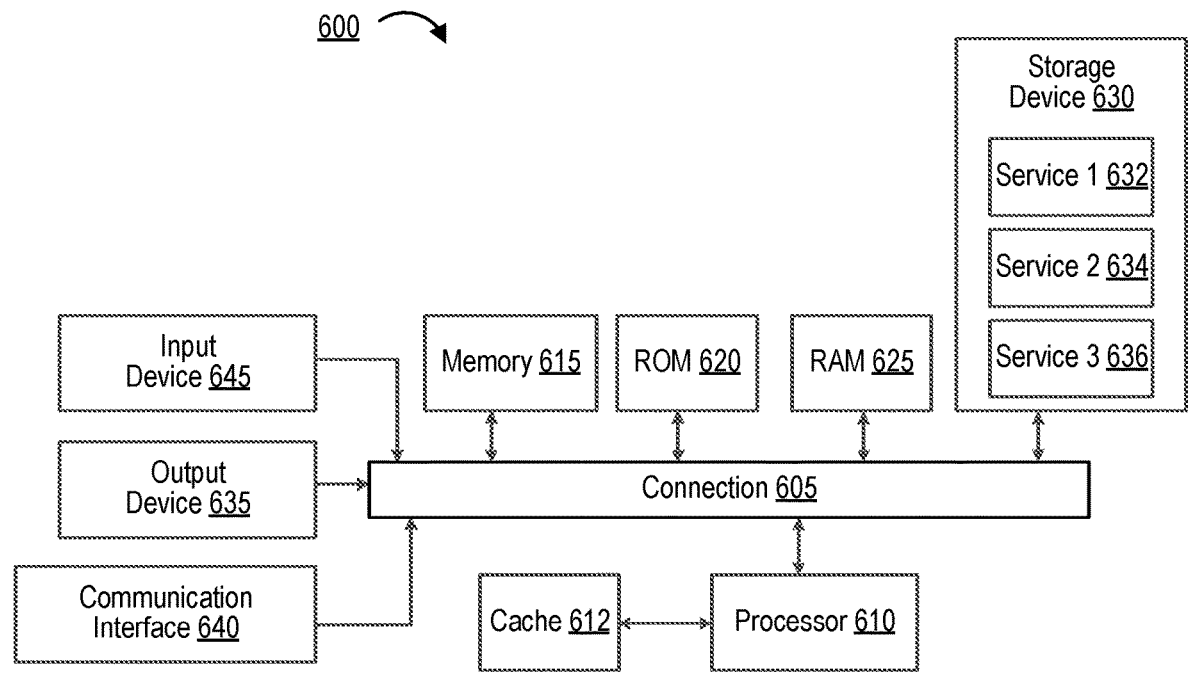
FIG. 6 is a diagram illustrating an example of a system for implementing certain aspects of the present technology.

FIG. 6 is a diagram illustrating an example of a system for implementing certain aspects of the present technology. In particular, FIG. 6 illustrates an example of computing system 600, which can be for example any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms. In some instances, multimodal systems can enable a user to provide multiple types of input/output to communicate with computing system 600.

Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for processing image data, the apparatus comprising:
    at least one memory configured to store one or more images captured by an image sensor; and
    at least one processor coupled to the at least one memory and configured to:
        obtain a caption for an image of a scene, the caption including at least one character associated with a portion of the scene that is represented in the image;
        obtain additional data other than the caption, the additional data including at least one of a time of day during which the image is captured, a location at which the image is captured, a date during which the image is captured, a scheduled event during which the image is captured, a second image of the scene captured at a different time than the image, a user image of a user holding an image capture device that captures the image, and a facial expression within a third image other than the image;
        determine an image processing setting based on the portion of the scene associated with the at least one character of the caption and the additional data; and
        process the image based on the image processing setting.

2. The apparatus of claim 1, wherein the apparatus is a mobile device.

3. The apparatus of claim 1, wherein the apparatus includes a display configured to display the image after processing the image.

4. The apparatus of claim 1, wherein the apparatus is a camera that includes the image sensor that captures the image.

5. The apparatus of claim 1, further comprising:
    an image sensor connector coupled to the image sensor, wherein the image sensor connector receives the image from the image sensor before the image processing setting is determined, wherein processing the image based on the image processing setting includes altering at least a first visual property of a group of pixels within the image.

6. The apparatus of claim 5, wherein processing the image based on the image processing setting includes adjusting levels associated with the first visual property for each of the group of pixels within the image based on the image processing setting, wherein the first visual property is one of brightness, contrast, saturation, color, hue, tone, sharpness, blur, or filtering.

7. The apparatus of claim 1, further comprising:
    an image sensor connector coupled to the image sensor, wherein the image sensor connector receives the image from the image sensor after the image processing setting is determined.

8. The apparatus of claim 7, wherein the at least one processor is configured to modify, based on the image processing setting, an image capture property of an image capture device from being set to a first image capture setting to being set to a second image capture setting before the image is captured by the image sensor of the image capture device, wherein the image is captured by the image sensor of the image capture device while the image capture property of the image capture device is set to the second image capture setting.

9. The apparatus of claim 8, wherein the image capture property includes at least one of an aperture size, an exposure time, an ISO speed, an analog gain, a flash, a high dynamic range (HDR), focus, a zoom, and a depth of field.

10. The apparatus of claim 1, wherein the at least one processor is configured to determine that the caption also includes one or more characters associated with a mood, wherein generating the image processing setting includes setting the image processing setting based on the mood.

11. The apparatus of claim 10, wherein the at least one processor is configured to identify a predetermined image processing setting that is associated with the mood, wherein setting the image processing setting based on the mood includes setting the image processing setting to the predetermined image processing setting that is associated with the mood.

12. The apparatus of claim 1, wherein the at least one processor is configured to determine that the at least one character in the caption is associated with an object depicted in the image, wherein generating the image processing setting includes setting the image processing setting based on the object depicted in the image.

13. The apparatus of claim 12, wherein the at least one processor is configured to identify a predetermined image processing setting that corresponds to the object depicted in the image, wherein setting the image processing setting includes setting the image processing setting to the predetermined image processing setting that corresponds to the object depicted in the image.

14. The apparatus of claim 1, wherein processing the image based on the image processing setting visually emphasizes a first area of the image over a second area of the image with respect to at least a first visual property, wherein the first visual property includes at least one of brightness, contrast, saturation, color, focus, depth of field, sharpness, or blur.

15. The apparatus of claim 1, wherein obtaining the caption for the image includes receiving the caption by receiving one or more inputs associated with the caption through an input device.

16. The apparatus of claim 1, wherein obtaining the caption for the image includes identifying the caption based on one or more messages associated with the image.

17. The apparatus of claim 1, wherein the at least one processor is configured to receive the second image, wherein the second image is captured by the image sensor before the image, wherein obtaining the caption for the image includes generating the caption by identifying one or more objects depicted in the second image using an object detection algorithm.

18. The apparatus of claim 1, wherein generating the image processing setting includes receiving the image processing setting from a machine learning model in response to inputting at least a subset of the caption into the machine learning model.

19. The apparatus of claim 18, wherein the machine learning model is trained based on training data that includes a plurality of images and a plurality of captions that each correspond to at least one of the plurality of images.

20. A method of processing image data, the method comprising:
  obtaining a caption for an image of a scene, the caption including at least one character associated with a portion of the scene that is represented in the image;
  obtaining additional data other than the caption, the additional data including at least one of a time of day during which the image is captured, a location at which the image is captured, a date during which the image is captured, a scheduled event during which the image is captured, a second image of the scene captured at a different time than the image, a user image of a user holding an image capture device that captures the image, and a facial expression within a third image other than the image;
  determining an image processing setting based on the portion of the scene associated with the at least one character of the caption and the additional data; and
  processing the image based on the image processing setting.

21. The method of claim 20, further comprising receiving the image from an image sensor before the image processing setting is determined, wherein processing the image based on the image processing setting includes altering at least a first visual property of a group of pixels within the image.

22. The method of claim 21, wherein processing the image based on the image processing setting includes adjusting levels associated with the first visual property for each of the group of pixels within the image based on the image processing setting, wherein the first visual property is one of brightness, contrast, saturation, color, hue, tone, sharpness, blur, or filtering.

23. The method of claim 20, further comprising receiving the image from an image sensor after the image processing setting is determined.

24. The method of claim 23, further comprising modifying, based on the image processing setting, an image capture property of an image capture device from being set to a first image capture setting to being set to a second image capture setting before the image is captured by the image sensor of the image capture device, wherein the image is captured by the image sensor of the image capture device while the image capture property of the image capture device is set to the second image capture setting.

25. The method of claim 24, wherein the image capture property includes at least one of an aperture size, an exposure time, an ISO speed, an analog gain, a flash, a high dynamic range (HDR), a focus, a zoom, and a depth of field.

26. The method of claim 20, further comprising determining that the caption also includes one or more characters associated with a mood, wherein generating the image processing setting includes setting the image processing setting based on the mood.

27. The method of claim 26, further comprising identifying a predetermined image processing setting that is associated with the mood, wherein setting the image processing setting based on the mood includes setting the image processing setting to the predetermined image processing setting that is associated with the mood.

28. The method of claim 20, further comprising determining that the at least one character is associated with an object depicted in the image, wherein generating the image processing setting includes setting the image processing setting based on the object depicted in the image.

29. The method of claim 28, further comprising identifying a predetermined image processing setting that is associated with the object depicted in the image, wherein setting the image processing setting includes setting the image processing setting to the predetermined image processing setting that corresponds to the object depicted in the image.

30. The method of claim 20, wherein processing the image based on the image processing setting visually emphasizes a first area of the image over a second area of the image with respect to at least a first visual property, wherein the first visual property includes at least one of brightness, contrast, saturation, color, focus, depth of field, sharpness, or blur.

31. The method of claim 20, further comprising determining that the caption includes one or more characters that also appear in a second caption associated with a second image, the second image being processed based on a second image processing setting, wherein generating the image processing setting includes setting the image processing setting based on the second image processing setting.

32. The method of claim 20, wherein obtaining the caption for the image includes receiving the caption by receiving one or more inputs associated with the caption through an input device.

33. The method of claim 20, wherein obtaining the caption for the image includes identifying the caption based on one or more messages associated with the image.

34. The method of claim 20, further comprising receiving the second image, wherein the second image is captured by an image sensor before the image, wherein obtaining the caption for the image includes generating the caption by identifying one or more objects depicted in the second image using an object detection algorithm.

35. The method of claim 20, wherein generating the image processing setting includes receiving the image processing setting from a machine learning model in response to inputting at least a subset of the caption into the machine learning model.

36. The method of claim 35, wherein the machine learning model is trained based on training data that includes a plurality of images and a plurality of captions that each correspond to at least one of the plurality of images.

37. A non-transitory computer-readable storage medium storing instructions that, when executed by at least one processor, cause the at least one processor to:

obtain a caption for an image of a scene, the caption including at least one character associated with a portion of the scene that is represented in the image;

obtain additional data other than the caption, the additional data including at least one of a time of day during which the image is captured, a location at which the image is captured, a date during which the image is captured, a scheduled event during which the image is captured, a second image of the scene captured at a different time than the image, a user image of a user holding an image capture device that captures the image, and a facial expression within a third image other than the image;

determine an image processing setting based on the portion of the scene associated with the at least one character of the caption and the additional data; and process the image based on the image processing setting.

* * * * *